(12) United States Patent
Baumann et al.

(10) Patent No.: US 8,268,927 B2
(45) Date of Patent: Sep. 18, 2012

(54) REDISPERSIBLE POLYMER POWDERS PREPARED FROM BLENDS OF CARBOXYLATE

(75) Inventors: Robert Baumann, Rueschlikon (CH); Juergen Dombrowski, Halle (DE); Hartmut Kuehn, Halle (DE); Etienne Lazarus, Marienthal (FR); Gerold A Lohmuller, Baden-Baden (DE); Margarita Perello, Dubendorf (CH); Yafei Zhu, Shanghai (CN)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 13/166,964

(22) Filed: Jun. 23, 2011

(65) Prior Publication Data

US 2012/0029119 A1 Feb. 2, 2012

Related U.S. Application Data

(60) Provisional application No. 61/398,374, filed on Jun. 24, 2010.

(51) Int. Cl.
| | |
|---|---|
| C08F 8/00 | (2006.01) |
| C08F 16/06 | (2006.01) |
| C08F 116/06 | (2006.01) |
| C08L 9/00 | (2006.01) |
| C08L 25/02 | (2006.01) |

(52) U.S. Cl. ............ 525/56; 525/191; 525/232; 525/241
(58) Field of Classification Search .................... 525/56, 525/191, 232, 240, 241
See application file for complete search history.

(56) References Cited

U.S. PATENT DOCUMENTS

| | | | |
|---|---|---|---|
| 3,822,230 | A | 7/1974 | Nelson |
| RE28,780 | E | 4/1976 | Bergmeister et al. |
| 4,478,974 | A | 10/1984 | Lee et al. |
| 6,451,900 | B1 | 9/2002 | Kuehn et al. |
| 6,632,861 | B1 | 10/2003 | Weitzel et al. |
| 6,699,339 | B2 | 3/2004 | Adler et al. |
| 2002/0062006 | A1 | 5/2002 | Sandor et al. |
| 2002/0120043 | A1 | 8/2002 | Rothenhausser et al. |
| 2004/0097622 | A1 | 5/2004 | Weitzel |
| 2007/0004834 | A1 | 1/2007 | Pakusch et al. |
| 2009/0192242 | A1 | 7/2009 | Willimann et al. |

FOREIGN PATENT DOCUMENTS

| | | |
|---|---|---|
| DE | 2049114 | 4/1972 |
| DE | 19853420 A1 | 5/2000 |
| DE | 10040826 A1 | 3/2002 |
| DE | 10064083 A1 | 7/2002 |
| DE | 10322787 A1 | 12/2004 |
| EP | 0989154 A2 | 3/2000 |
| EP | 1420001 A1 | 5/2004 |
| GB | 1419833 | 12/1975 |
| WO | 9738042 A1 | 10/1997 |
| WO | 9932541 A1 | 7/1999 |
| WO | 2005095495 A1 | 10/2005 |
| WO | 2006099960 A1 | 9/2006 |
| WO | 2009009917 A1 | 8/2009 |

*Primary Examiner* — Nathan M Nutter
(74) *Attorney, Agent, or Firm* — Andrew E. C. Merriam

(57) ABSTRACT

A water redispersible polymer powder is produced by drying an aqueous mixture of a high $T_g$ carboxylated styrene butadiene polymer and a low $T_g$ carboxylated styrene butadiene polymer, where the ratio of the mean or average particle size of the high $T_g$ polymer to the particle size of the low $T_g$ polymer is from 1:1 to 5:1, preferably from 1:1 to 3:1, and the amount of the high $T_g$ polymer is from 20 wt. % to 35 wt. %, preferably from 25 wt. % to 30 wt. %, based upon the total weight of the high $T_g$ polymer and the low $T_g$ polymer. Cement compositions such as mortars, which contain the redispersible polymer powder exhibit unexpectedly superior high bond strength and high impact resistance.

10 Claims, No Drawings

REDISPERSIBLE POLYMER POWDERS PREPARED FROM BLENDS OF CARBOXYLATE

FIELD OF THE INVENTION

The present invention relates to redispersible polymer powder compositions which are prepared from blends of carboxylated styrene butadiene copolymer latexes having different average particle sizes and different glass transition temperatures ($T_g$s) for use in cement compositions.

BACKGROUND OF THE INVENTION

In construction applications, mortars may be prepared with cement, sand, and organic polymer. To reduce shipping costs, the polymer can be shipped and added in dry form as a redispersible polymer powder. Redispersible polymer powders are used as binders to improve the adhesion of cementicious adhesive formulations. The redispersible polymer powders should provide high bond strength to both surfaces to be joined, such as to both concrete and expanded polystyrene boards (EPS), which are used as insulation material in external thermal insulation systems (ETICS), and to tiles and flooring or wall board in cement based tile adhesives. Another key performance requirement besides adhesion in applications such as EPS board in ETICS is to provide impact resistance to physical stress. However, generally high bond strength is in conflict with the high flexibility required to give good impact resistance.

International Patent Publication No. WO 99/32541 to Kuehn et al, and its U.S. National Stage patent family member U.S. Pat. No. 6,451,900, discloses a blend of two polymers, where Polymer I is a film forming polymer at room temperature and Polymer II is water insoluble at neutral pH and contains carboxylic groups. Polymer II works as a protective shell. It has a much smaller particle size (by a factor of about 5 to 150) and a higher $T_g$. However, Polymer II does not contribute to the film and cannot be considered as a binder.

Mortars formulated with the styrene butadiene redispersible polymer powders (SB RDPs) of the present invention exhibit both an unexpectedly high bond strength and high impact resistance in cementicious adhesive formulations, such as those employed with expanded polystyrene boards (EPS), which are used as insulation material in external thermal insulation systems (ETICS), and cement based tile adhesives (CBTAs). Accordingly, the present invention solves the problem of having high bond strength and high impact resistance at the same time in cementicious adhesive formulations by use of a carboxylated styrene butadiene redispersible polymer powder prepared from a blend of different carboxylated SB latexes or polymers having different glass transition temperatures ($T_g$s) in critical particle size ratios.

SUMMARY OF THE INVENTION

The present invention provides a redispersible polymer powder (RDP) comprised of blends of carboxylated styrene butadiene copolymer latexes or polymers having different glass transition temperatures ($T_g$s) in critical particle size ratios and in critical relative amounts for use in cementicious compositions. The water redispersible polymer powder of the present invention imparts both an unexpectedly high bond strength and high impact resistance in cementicious adhesive formulations.

The RDP comprises a co-dried admixture of a water insoluble film-forming high $T_g$ polymer (A) having a glass transition temperature ($T_g$) of greater than 15° C., preferably at least 20° C., most preferably at least 25° C. but less than or equal to 50° C., and a water insoluble film-forming low $T_g$ polymer (B) having a glass transition temperature ($T_g$) of from −30° C. to +10° C., preferably from −20° C. to 0° C. The ratio of the average or mean particle size of the high $T_g$ polymer to the average or mean particle size of the low $T_g$ polymer is critically from 1:1 to 5:1, preferably from 1:1 to 3:1, and the amount of the high $T_g$ polymer is critically from 20 wt. % to 35 wt. %, preferably from 25 wt. % to 30 wt. %, based upon the total weight of the high $T_g$ polymer and the low $T_g$ polymer. The high $T_g$ polymer may have an average particle size of from 50 nm to 500 nm, preferably from 100 nm to 400 nm, most preferably from 150 nm to 300 nm. The low $T_g$ polymer may have an average particle size of from 20 nm to 400 nm, preferably from 50 nm to 300 nm, most preferably from 100 nm to 200 nm. The high $T_g$ film-forming polymer and the low $T_g$ film forming polymer may each comprise a styrene-butadiene copolymer or the copolymerization product of styrene, butadiene and one or more other monomer, and may each have an amount of carboxylation of from 0.1 wt. % to 10 wt. %, preferably from 0.5 wt. % to 7 wt. %, more preferably from 1 wt. % to 5 wt. %, of at least one ethylenically unsaturated mono- and/or di-carboxylic acid, salts thereof, or mixtures thereof, preferably itaconic acid and/or maleic acid, and/or fumaric acid, based upon the weight of the water insoluble film forming polymer. The amount of carboxylation in the high $T_g$ polymer and the low $T_g$ polymer may be the same or different.

The water redispersible SB polymer powder may include one or more colloidal stabilizer, preferably a polyvinyl alcohol (PVOH), and a fatty acid salt, such as sodium oleate. The fatty acid salt helps to reduce water absorption while improving bonding strength and adhesion after water immersion, without adversely affecting adhesion at room temperature, and also improves impact resistance.

In an aspect of the present invention, the redispersible polymer powder may be produced by drying an aqueous mixture of the water insoluble film-forming high $T_g$ polymer and low $T_g$ polymer, and the colloidal stabilizer, and preferably a fatty acid salt, to obtain the water redispersible polymer powder. An aqueous dispersion of each of the water insoluble film-forming polymers may be provided by polymerization, and the colloidal stabilizer may be admixed with the aqueous dispersions of the high $T_g$ polymer and low $T_g$ polymer after polymerization, and then the aqueous dispersion may be spray dried to obtain the water redispersible polymer powder. The redispersible polymer powders provide high bond strength to both surfaces to be joined, such as to both concrete and expanded polystyrene boards (EPS), which are used as insulation material in external thermal insulation systems (ETICS), and to tiles and flooring or wall board in cement based tile adhesives. In addition to providing excellent adhesion in applications such as EPS board in ETICS the RDPs of the present invention provide impact resistance to physical stress.

In another aspect of the present invention, a cement composition such as a cement based tile adhesive, or ETIC adhesive, may be produced by admixing cement ingredients with the water redispersible polymer powder made from the codried high $T_g$ polymer and low $T_g$ polymer latexes to obtain a composition, such as a mortar, which exhibits an unexpectedly high bond strength and high impact resistance.

DETAILED DESCRIPTION OF THE INVENTION

Unless otherwise indicated, all temperature and pressure units are room temperature and standard pressure (STP). All ranges recited are inclusive and combinable.

All phrases comprising parentheses denote either or both of the included parenthetical matter and its absence. For example, the phrase "(meth)acrylate" includes, in the alternative, acrylate and methacrylate.

As used herein, the term "(meth)acrylate" means acrylate, methacrylate, and mixtures thereof and the term "(meth) acrylic" used herein means acrylic, methacrylic, and mixtures thereof.

As used herein, unless otherwise indicated, the phrase "molecular weight" refers to the number average molecular weight as measured in conventional manner.

As used herein, the term "polymer" refers, in the alternative, to a polymer made from one or more different monomer, such as a copolymer, a terpolymer, a tetrapolymer, a pentapolymer etc., and may be any of a random, block, graft, sequential or gradient polymer.

As used herein, unless otherwise indicated, the measured glass transition temperature ($T_g$) is used. As used herein the term "calculated $T_g$" refers to the $T_g$ of a polymer calculated by using the Fox equation (T. G. Fox, *Bull. Am. Physics Soc.*, Volume 1, Issue No. 3, page 123 (1956). As used herein the term "measured $T_g$" means a $T_g$ that is measured using differential scanning calorimetry or DSC (rate of heating 10° C. per minute, $T_g$ taken at the midpoint of the inflection.)

As used herein, the phrase "wt. %" stands for weight percent.

As used herein, unless otherwise indicated, the phrase "average particle size", refers to the particle diameter or the largest dimension of a particle in a distribution of latex and redispersible polymer powder particles as determined by laser light scattering such that 50 wt. % of the particles in the distribution are smaller than the particle and 50 wt. % of the particles in the distribution are larger than the particle. For initial latex dispersion particles, the average particle size was measured using a Nanotrac NPA 150, a product of Microtrac Inc (York, Pa.) per manufacturer's recommended Procedures via dynamic light scattering. The Doppler shift of light scattered from particles undergoing Brownian motion is compared to a reference beam established by the Fresnel reflection of the laser at the waveguide/medium interface (heterodyne detection) to generate a frequency spectrum, which is subsequently converted to a histogram of particle diameters through the Stokes-Einstein equation. A volume average particle size was recorded. For redispersed particles, the particle size distribution was measured using a Coulter LS 230 particle size analyzer, a product of Beckman Coulter (Brea, Calif.) per manufacturer's recommended Procedures via laser scattering. The scattering light from particles through laser scattering and polarization intensity differential scattering is collected as a function of angle, and subsequently converted to a particle size distribution.

The present inventors have found that for redispersible polymer powders, redispersible powders based on a blend of different carboxylated styrene butadiene aqueous dispersions having different $T_g$s in critical particle size ratios and in critical relative amounts results in cement compositions having unexpectedly high bond strength, high impact resistance, and improved water repellency. The combination of properties are significantly improved compared to blends where the high $T_g$ latex has a smaller particle size than the soft component or low $T_g$ latex. The combination of properties is also significantly better than performance of a powder based on a single latex. Generally, high bond strength or high adhesive strength is often in conflict with the high flexibility required to give good impact resistance, but that is not the case with the blends employed in the present invention. The styrene/butadiene based redispersible polymer powders of the present invention may be used as a binder in dry-mix cementicious mortar formulations, such as mortars used as adhesives and base coats for ETICS to provide both adhesion and impact resistance to physical stress for EPS boards in ETICS, and high bond strength to concrete. It has been found that unexpectedly superior performance can be achieved when the high $T_g$ latex particle size is equal to or greater than the particle size of the low $T_g$ latex. In addition, it has been found that inclusion of a fatty acid salt, such as sodium oleate with the SB-based RDP, helps to reduce water absorption while improving bonding strength and adhesion after water immersion, without adversely affecting adhesion at room temperature, and also improves impact resistance.

The polymers which may be employed in the present invention are water insoluble film-forming polymers which are carboxylated. Preferred water insoluble film-forming polymers are a styrene-butadiene copolymer or a styrene and butadiene copolymerized with other monomers with a low degree of carboxylation.

The water insoluble film-forming copolymers can be prepared by aqueous emulsion or suspension polymerization, preferably emulsion polymerization, in conventional manner, employing conventional polymerization temperatures, e.g. from 40° C. to 120° C., preferably, 70° C. or more, or, preferably, up to 105° C., and pressures, e.g. with diene comonomer pressures being 150 psi or below, preferably, 100 psi or below. The polymerization may be initiated using conventional amounts of one or more conventional water-soluble such as sodium persulphate, or oil (monomer) soluble initiator, such as t-butyl peroxide and cumene hydroperoxide, or a redox initiator combination, using a reducing agent such as sulfites and bisulfites. To control the molecular weight, conventional regulator substances or chain transfer agents, such as mercaptans, alkanols, and dimeric alpha methylstyrene can be used during the polymerization in conventional manner in conventional amounts of from 0.01:1 to 5:1.0 wt. %, or, preferably, up to 3 wt. %, based on the monomers to be polymerized. The polymerization process preferably takes place in known manner in the presence of conventional amounts of one or more conventional emulsifier and/or protective colloid, such as, for example, water soluble copolymers having a number average molecular weight of 2000 or more. Suitable emulsifiers include anionic, cationic and nonionic emulsifiers, for example anionic surfactants such as, for example, 8 to 18 carbon alkyl or alkyl aryl ether sulfates, and their salts, and nonionic surfactants, such as, for example, alkyl or alkyl aryl polyglycol ethers. Suitable protective colloids, instead of or in addition to one or more surfactants, may include, for example, polyvinyl alcohols; polysaccharides in water-soluble form, e.g. starches and cellulosics; proteins such as, for example, casein or soy protein; lignin sulfonates; and synthetic copolymers such as, for example, poly(meth) acrylic acid, and copolymers of (meth)acrylates with carboxyl-functional comonomer units.

One or more basic compound may be added before, during or after polymerization in an amount of 0.4 moles or more, preferably from 0.5 to 2 moles, more preferably 0.6 to 1.8 moles of carboxylic groups in the copolymer. Alternatively, the basic compound can be added in such an amount to adjust the pH of the aqueous copolymer product to 8.0 or more, or 9.5 or more, or, preferably at least 10.5, and preferably up to 12.5. The basic compound may be an inorganic basic compound, preferably a strong inorganic basic compound, such as an alkali metal hydroxide or an alkaline earth metal hydroxide, such as sodium hydroxide or potassium hydroxide.

The copolymers comprise the copolymerization product of from 20 to 79.9%, preferably, 30% or more, for example from 50% to 70 wt. %, of one or more vinyl aromatic comonomer a), up to 79.9% preferably 60% or less, for example from 25% to 49% by weight of one or more 1,3-diene comonomer b) from 0.1 to 10% preferably from 0.5% to 7% or, more preferably from 1% to 5 wt. % of comonomer c), and from 0 to 40%, preferably 0 to 20% or, more preferably 10% or less, by weight, of comonomer d), based on the total weight of monomers used to make the copolymer.

For the water insoluble film-forming high $T_g$ polymer, the comonomers and their weight proportions are chosen so as to make a copolymer having a glass transition temperature ($T_g$) of greater than 15° C., preferably at least 20° C., most preferably at least 25° C. but less than or equal to 50° C. so as not to interfere with film formation. For the water insoluble film-forming low $T_g$ polymer or soft polymer, the comonomers and their weight proportions are chosen so as to make a copolymer having a glass transition temperature ($T_g$) of from −30° C. to +10° C., preferably from −20° C. to 0° C.

Suitable comonomers a) include, for example, styrene, alpha-methylstyrene, $C_1$-$C_4$ alkyl-styrenes, such as o-vinyl-toluene and tert-butylstyrene. Styrene is preferred. Suitable comonomers b) include, for example, 1,3-butadiene and isoprene, 1,3-butadiene being preferred. Suitable comonomers c) include, for example, ethylenically unsaturated mono-carboxylic acids, and/or di-carboxylic acids, their anhydrides, and their salts, and mixtures thereof, particularly itaconic acid and/or maleic acid and/or fumaric acid to improve the dispersibility of the redispersible copolymer powder.

Suitable optional comonomers d) include, for example, alkyl esters of (meth)acrylic acid, such as, for example, methyl methacrylate, ethylenically unsaturated carboxamides and carbonitriles, such as, for example, (meth)acrylonitrile; diesters of fumaric acid or maleic acid; hydroxy alkyl (meth)acrylates; sulfur acid monomers, phosphorus acid monomers, crosslinking comonomers, such as, for example, divinyl benzene or divinyl adipates; postcrosslinking comonomers, such as acrylamidoglycolic acid (AGA), allyl methacrylates or allyl N-methylol carbamates; epoxy-functional comonomers, such as glycidyl (meth)acrylates; and silicon-functional comonomers, such as alkoxysilane containing (meth)acrylates or vinyl monomers.

To increase the water redispersibility of the powder obtained upon drying, a basic compound, as described above, can be added prior to substantially drying the aqueous copolymer dispersion.

In a preferred embodiment, to achieve good water redispersibility and good odor control, 75% or more, preferably, 85% or more, or, more preferably, 95% or more of the total number of carboxyl groups in the copolymer are located at the surface of the copolymer latex particles in the powder particles. In such copolymers, 75% or more, preferably, 85% or more, or, more preferably, 90% or more, or, most preferably, 95% or more of the surface carboxyl groups are present in their salt form in the copolymer latex particles in the powder. A high level of surface and serum acid as well as the degree of neutralization provides good redispersibility and thus good end use performance.

A high percentage of the carboxylic groups located at the surface of the copolymer particles obtained upon drying can be obtained by the sole use of ethylenically unsaturated dicarboxylic acid(s) as comonomer c), by staged monomer feeding, such as addition of the comonomer c) at an advanced stage of the polymerizations, or by conducting the polymerization at a pH of from 3 to 9 preferably, from 4 to 8, or, preferably 6 or higher.

The percentage of the carboxylic groups that are located at the surface of the polymer particles in the powder obtained upon drying encompasses all of the carboxylic groups located at the surface of the copolymer particles, those located in the liquid phase in low molecular weight acid aqueous solution copolymers or as free carboxylic acids or their salts, e.g. citric acid. Upon drying of the aqueous copolymer dispersion, the carboxylic groups located in the liquid phase solution copolymers deposit on the surface of the copolymer particles.

The sum of the molar amount of carboxylic groups located at the surface of the copolymer particles and the molar amount of carboxylic groups in the liquid phase of the aqueous dispersion are separately measurable in conventional manner.

In embodiments of the invention, the water insoluble film forming polymer has an amount of carboxylation as described above for comonomer c), such as, for example, from 0.1 wt. % to 10 wt. %, preferably from 0.5% by weight to 7 wt. %, more preferably from 1 wt. % to 5 wt. %, of itaconic acid based upon the total comonomer weight or the weight of the water insoluble film forming polymer.

In accordance with the present invention, the water insoluble film-forming high $T_g$ polymer in the aqueous dispersion or latex which is to be spray dried may have an average or mean particle size of from 50 nm to 500 nm, preferably from 100 nm to 400 nm, most preferably from 150 nm to 300 nm. The water insoluble film-forming low $T_g$ polymer may have an average or mean particle size of from 20 nm to 400 nm, preferably from 50 nm to 300 nm, most preferably from 100 nm to 200 nm. The ratio of the average or mean particle size of the high $T_g$ polymer to the average or mean particle size of the low $T_g$ polymer is critically 1:1 or more, but should not exceed 5:1, and is preferably from 1:1 to 3:1 so as to obtain both an unexpectedly high bond strength and high impact resistance in cementicious adhesive formulations. In addition, the amount of the high $T_g$ polymer employed in the blend of the water insoluble film-forming high $T_g$ polymer and low $T_g$ polymer is critically from 20 wt. % to 35 wt. %, preferably from 25 wt. % to 30 wt. %, based upon the total weight of the high $T_g$ polymer and the low $T_g$ polymer so as to obtain both an unexpectedly high bond strength and high impact resistance in cementicious adhesive formulations.

The aqueous dispersions or latex, which refers generically to a stable dispersion or emulsion of polymer microparticles in an aqueous medium, employed in the present invention for the high $T_g$ polymer and the low $T_g$ polymer, and obtained by blending of the high $T_g$ polymer and the low $T_g$ polymer in accordance with the present invention, may each generally have a solids content of from 30 to 75 wt. %, for example between 35% and 65 wt. %, preferably from 40 to 60 wt. %.

In embodiments of the invention, the water redispersible polymer powder compositions of the present invention include a co-dried admixture of a water insoluble film-forming high $T_g$ polymer, a water insoluble film-forming low $T_g$ polymer, a colloidal stabilizer for colloidal stabilization or as a drying aid, and application relevant additives, preferably a fatty acid salt, such as sodium oleate, and/or a superplasticizer such as a water soluble co-polymer dispersant, such as MELFLUX 2651F, which is based on modified polycarboxylate technology and produced by BASF Construction Polymers, Kennesaw Ga. Conventional colloidal stabilizers, such as polyvinyl alcohol (PVOH) may be employed as a colloidal stabilizer in conventional amounts. Preferred polyvinyl alcohols for use herein are partially hydrolyzed polyvinyl alcohols. In embodiments of the invention, the amount of PVOH or other known colloidal stabilizers employed to achieve colloidal stability may be at least 1 wt. %, for example from 2 wt. % to 30 wt. %, preferably from 5 wt. % to 20 wt. %, based upon the weight of the water insoluble film-forming polymers, or the total weight of the high $T_g$ polymer and the low $T_g$ polymer. In embodiments of the invention, the optional fatty acid salt, such sodium oleate may be employed in an amount which helps to reduce water absorption while improving bonding strength and adhesion after water immersion, without adversely affecting adhesion at room temperature, and which also improves impact resistance. In embodiments of the invention, the amount of the fatty acid salt, such as sodium oleate, may be up to 20 wt. %, for example from 5 wt. % to 15 wt. %, upon the weight of the water insoluble film-forming polymers, or the total weight of the high $T_g$ polymer and the low $T_g$ polymer. In embodiments of the invention, one or more conventional water reducing agents, such as lignin sulfonates, naphthalene sulfonates or polycarboxylate esters, may be employed in conventional amounts in combination with PVOH as a protective colloid or spray drying aid. Conventional hydrophobic agents, such as zinc stearate, may also be employed in the same dosage levels as the sodium oleate to further improve water resistance without reducing adhesion at room temperature as is the case with vinyl acetate-ethylene copolymer (VAE) RDPs.

In accordance with the method of making the redispersible polymer powder of the present invention, a water redispersible polymer powder may be produced by drying an aqueous mixture of the water insoluble film-forming high $T_g$ polymer, water insoluble film-forming low $T_g$ polymer, and a colloidal stabilizer, with or without a fatty acid salt such as sodium oleate, to obtain a water redispersible polymer powder. In preferred embodiments, an aqueous dispersion of the water insoluble film-forming high $T_g$ polymer obtained by polymerization, and an aqueous dispersion of the water insoluble film-forming low $T_g$ polymer obtained by polymerization, are admixed together to obtain a dispersion of the two polymers, and then the resulting dispersion is admixed with the colloidal stabilizer to obtain a substantially homogeneous aqueous dispersion which is then spray dried to obtain the water redispersible polymer powder of the present invention. In embodiments of the invention, the colloidal stabilizer and other components may be admixed with the high $T_g$ polymer dispersion and the low $T_g$ polymer dispersion before combining or blending of the two dispersions. In other embodiments, the colloidal stabilizer and the other components may be admixed after the high $T_g$ polymer dispersion and the low $T_g$ polymer dispersion are combined to obtain a substantially homogeneous aqueous dispersion. In one example, the viscosity of the feed to be spray-dried may be adjusted via the solids content so that a value of less than 1000 mPas (Brookfield viscosity at 20 revolutions and 23° C.), preferably less than 250 mPas, is obtained. The solids content of the dispersion to be spray-dried may generally be from 25% to 75 wt. %, for example from 35 wt. % to 65 wt. %, preferably from 40% to 60 wt. %, based on the total weight of the dispersion. To prepare the water-redispersible polymer powders, the aqueous dispersions are dried, preferably by spray drying. Spray drying can be carried out in customary spray drying plants, with atomization being carried out by means of single-fluid, two-fluid or multifluid nozzles or a rotary disc atomizer. In general, air, nitrogen or nitrogen enriched air may be employed as the drying gas, the inlet temperature of the drying gas generally not exceeding 200° C., preferably from 110° C. to 180° C., more preferably from 130° C. to 170° C. The outlet temperature may generally be from 45° C. to 120° C., preferably from 60° C. to 90° C., depending on the plant, the $T_g$ of each resin and the desired degree of drying.

In addition to the colloidal stabilizer, conventional optional additives or components in conventional amounts can be added prior to drying the aqueous dispersion, such as an antifoaming agent in an amount of up to 1.5 wt. % of antifoam, based on the weight of the polymer particles. Other additives which may be employed, in conventional amounts, include one or more salts, such as $CaCl_2$, and $MgCl_2$, emulsifiers or surfactants, monosaccharides, disaccharides, and anticaking agents (antiblocking agents) such as kaolin, calcium carbonates or silicates. The amount of the anticaking agent, or other inorganic fillers may generally be up to 40 wt. %, based upon the weight of the water redispersible polymer powder (RDP). In embodiments of the invention, conventional superplasticizers may be employed in an amount of at least 0.01 wt. %, preferably from 5 wt. % to 25 wt. %, based upon the weight of the water redispersible polymer powder (RDP).

The X50 size of the particle size distribution of the redispersible powder depends on drying conditions and drying equipment. X50 represents the median diameter in micrometers, which means that 50 wt. % of the particles are smaller than this diameter. The produced water-redispersible polymer powder preferably has an X50 particle size diameter of from 5 to 300 micrometers, preferably from 20 to 200 micrometers, most preferably from 50 to 100 micrometers. The particle size distribution of the powder can be measured by laser diffraction using a particle size analyzer "Sympatec Helos" at a measuring range of 1.8-350 µm and dispersing the powder by compressed air.

The weight of the polymer particles in the powder, for example, weight of the carboxylated high $T_g$ and low $T_g$ copolymers of vinyl aromatic comonomer and 1,3-diene comonomer described herein in the powder, may preferably be from 40 wt. % to 95 wt. %, more preferably from 65 wt. % to 87 wt. %, of the total weight of the water-redispersible polymer powder.

The water-redispersible polymer powders of the present invention have a variety of uses. In embodiments of the invention, the carboxylated styrene-butadiene redispersible polymer powders of the present invention may be employed in blends with one or more acrylic redispersible polymer powders (RDPs), VAE RDPs, VAE/VeoVA RDPs, epoxy based RDPs, polyolefin dispersion based RDPs, and mixtures thereof. The powders of the present invention may be employed as functional additives in a wide variety of compositions such as construction materials, personal care compositions, pharmaceutical compositions, and agricultural compositions, in high salt concentration applications or environments, such as off-shore oil well cementing, oil and gas drilling and cementing, and in hard water. Additional uses of the powders are in waste management applications, such as compositions for synthetic covers for bulk material piles, such as waste, coal sludge containment, soil, soil erosion control, which minimize water infiltration, nuisance fugitive dust, odor, and affinity to birds. The powders may be used in alternative landfill covers that are sprayable, use inexpensive widely available and environmentally friendly recycled materials, have good adherence to plastics and glass waste, and can form/harden within a short time, and in adhesion enhancing admixtures. The powders may also be employed in the production of foams, such as polyurethane foams.

In preferred embodiments, the water-redispersible polymer powder may be used as an additive in a setting composition which may further include an inorganic hydraulic binder. Examples of inorganic binders include cements, such as Portland cement, alumina cement, pozzolanic cement, slag cement, magnesia cement and phosphate cement; gypsum hemihydrate and water-glass. Illustrative uses of the polymer composition according to the present invention are in tile adhesives, construction adhesives, renders, joint mortars, plasters, troweling compositions, filling compositions, such as floor filling compositions (e.g. self-leveling flooring compounds), concrete repair joints, joint mortars, tape joint compounds, concrete, water proofing membrane applications, crack isolation membrane applications, and additives for ceramic processing. In particular, the use of the water-redispersible polymer powder described herein in a setting composition, e.g. in cement-based tile adhesives or in external thermal insulation composite systems, result in compositions with high initial adhesion strength, high adhesion strength after immersion in water (water resistance), and high adhesion strength after allowing a certain "open time" before final application of the hydrated setting composition. In embodiments of the invention, the water-redispersible polymer powder may be employed as a binder for slip casting, of for example raw materials such as silica, alumina, alkali metal oxides, and alkaline earth metal oxides.

A preferred use of the water-redispersible polymer powder is in concrete compositions or other compositions which exhibit a high pH, for example a pH of at least 11, for example from 11.5 to 13.5. The redispersible polymer powders of the present invention may be employed in tile adhesives, such as cement-based tile adhesives. Cement-based tile adhesives may generally comprise 5 to 50 parts by weight of cement, preferably Portland cement, as the hydraulic binder; 40 to 70 parts by weight of quartz sand, preferably having a particle size of from 0.1 mm to 0.5 mm, as the main filler, and 0.1% to 10 wt. %, preferably 1% to 6 wt. % (based on the dry weight of the tile adhesive) of the redispersible polymer powder according to the present invention. Further optional components include one or more cellulose ethers (preferably in a total amount of 0.05% to 1 wt. %, more preferably 0.2% to 0.5 wt. %, based on the dry weight of the tile adhesive) to control rheology, water retention, slip resistance and improved workability; quartz or lime stone powder having a particle size of from 30 µm to 60 µm as fine co-filler to improve consistency and workability; and cellulose or mineral fibers to improve the slip resistance.

In preferred embodiments, the water-redispersible polymer powder may be used in external thermal insulation systems ETICS, particularly as an adhesive on the thermally insulating board layer to reduce the water absorption and improve the impact resistance of the external thermal insulation system. Another use of the water-redispersible polymer powders is in self-leveling flooring compounds SLFC. The powders may be added to improve the adhesion to the substrate, the flexibility, the abrasion resistance and the aging properties. The SLFC and the ETICS adhesives may generally include the same components, such as Portland cement, quartz sand, and limestone filler, and rheology modifier, in the same amounts as employed in the CBTAs.

Furthermore, the water-redispersible polymer powder according to the present invention may be used in paper products, paperboard products, carpet backing, paints or coatings or in binders for wood, paper or textiles coatings or impregnating compositions, preferably in the absence of a substantial amount of an inorganic hydraulic binding agent, more preferably in the absence of any amount of an inorganic hydraulic binding agent. For example, the water-redispersible polymer powder may be used as the sole binder in coating compositions and adhesives.

The following examples are provided for illustrative purposes only and are not intended to limit the scope of the claims that follow. Unless otherwise indicated, all parts and percentages are by weight, all temperatures are in ° C., and all pressures are in bars or atmospheric unless otherwise indicated to the contrary:

EXAMPLE 1

A redispersible polymer powder was produced by admixing: a) a high $T_g$ water insoluble film forming carboxylated styrene butadiene (SB) latex which has a comonomer content of 73.0 parts styrene, 24.0 parts butadiene, and 3.0 parts itaconic acid (a carboxylation of 3.0 wt. % of itaconic acid, based upon the total comonomer weight, and a percentage of total acid found on the surface and in the serum of 95%), with a mean particle size of 168 nm, and a $T_g$ of +32° C., b) a low $T_g$ water insoluble film forming carboxylated styrene butadiene (SB) latex which has a comonomer content of 53.7 parts styrene, 43.3 parts butadiene, and 3.0 parts itaconic acid (a carboxylation of 3.0 wt. % of itaconic acid, based upon the total comonomer weight, and a percentage of total acid found on the surface and in the serum of 97%), with a mean particle size of 168 nm, and a $T_g$ of −12° C., and c) 10 wt. % of MOWIOL 4-88, based upon the total weight of the high $T_g$ latex polymer and the low $T_g$ latex polymer. The amounts of the latexes employed are such so as to provide a latex blend with a weight ratio of the high $T_g$ polymer to the low $T_g$ polymer of 30:70, or the amount of the high $T_g$ polymer is 30 wt. %, based upon the total weight of the high $T_g$ polymer and the low $T_g$ polymer. The glass transition temperature $T_g$ was determined using the Differential Scanning Calorimetry measurement principle at 10° C./min., midpoint-determination according to DIN 53765 and using Mettler Toledo DSC 822 equipment. The particle size was measured using Nanotrac 150 equipment. The measurement principle is based on Dynamic Light Scattering incorporating Controlled Reference Method for advanced power spectrum analysis of Doppler shifts under Brownian motion. The MOWIOL 4-88 is a partially hydrolyzed PVOH (polyvinylalcohol) in granular form, and is available from Kuraray Europe GmbH, Division PVA/PVB D-65926 Frankfurt am Main, Germany. The MOWIOL 4-88 has a viscosity DIN 53015 of 4±0.5 mPa-s (4% aqueous solution at 20° C.), a degree of hydrolysis (saponification) of 87.7±1.0 mol. %, an ester value DIN 53401 of 140±10 mg KOH/g, a residual acetyl content of 10.8±0.8 w/w %, and a maximum ash content of 0.5% (calculated as $Na_2O$). The mixture has a total solids content of 38 wt. %, based upon the total weight of the mixture. All latexes were neutralized prior to spray drying to a pH of 11.

This mixture was pumped to a two-fluid nozzle atomizer equipped on a Mobile Minor spray dryer. The air pressure to the nozzle was fixed at 2 bar with 50% flow which is equivalent to 8 kg/hr of airflow. The spray drying was conducted in an air environment with an inlet temperature fixed at 140° C., and the outlet temperature was targeted to 50° C.±1° C. by tuning the feed rate of the mixture. Concurrently, kaolin powder (KaMin HG 90) was added into the chamber for spray drying as an anti-caking agent, with the amount being controlled to be 13 wt. % of the dry powders.

The redispersible polymer powder obtained by the spray drying had an average particle size between 10 to 20 µm. The spray dried powder is readily dispersible in water. The predominant particle size of the redispersion is determined by the particle size distribution of the original SB latex.

EXAMPLE 2

A redispersible polymer powder was produced as in Example 1 except that in Example 2 the redispersible polymer powder may be produced using: a) a high $T_g$ water insoluble film forming carboxylated styrene butadiene (SB) latex which has a comonomer content of 74.0 parts styrene, 23.0 parts butadiene, and 3.0 parts itaconic acid (a carboxylation of 3.0 wt. % of itaconic acid, based upon the total comonomer weight, and a percentage of total acid found on the surface and in the serum of 97%), with a mean particle size of 243 nm, and a $T_g$ of +34° C., b) a low $T_g$ water insoluble film forming carboxylated styrene butadiene (SB) latex which has a comonomer content of 53.7 parts styrene, 43.3 parts butadiene, and 3.0 parts itaconic acid (a carboxylation of 3.0 wt. % of itaconic acid, based upon the total comonomer weight, and a percentage of total acid found on the surface and in the serum of 97%), with a mean particle size of 178 nm, and a $T_g$ of −12° C., and c) a weight ratio of the high $T_g$ polymer to the low $T_g$ polymer of 25:75, or the amount of the high $T_g$ polymer is 25 wt. %, based upon the total weight of the high $T_g$ polymer and the low $T_g$ polymer.

EXAMPLE 3

A redispersible polymer powder was produced as in Example 2 except that in Example 3 the redispersible polymer powder may be produced using a weight ratio of the high $T_g$ polymer to the low $T_g$ polymer of 30:70, or the amount of the high $T_g$ polymer is 30 wt. %, based upon the total weight of the high $T_g$ polymer and the low $T_g$ polymer.

EXAMPLE 4

A redispersible polymer powder was produced as in Example 2 except that in Example 4 the redispersible polymer powder may be produced using a weight ratio of the high $T_g$ polymer to the low $T_g$ polymer of 35:65, or the amount of the high $T_g$ polymer is 35 wt. %, based upon the total weight of the high $T_g$ polymer and the low $T_g$ polymer.

Comparative Example A

A redispersible polymer powder was produced as in Example 1 except that in Comparative Example A the redispersible polymer powder may be produced using: a) a high $T_g$ water insoluble film forming carboxylated styrene butadiene (SB) latex which has a comonomer content of 69.4 parts styrene, 27.6 parts butadiene, and 3.0 parts itaconic acid (a carboxylation of 3.0 wt. % of itaconic acid, based upon the total comonomer weight, and a percentage of total acid found on the surface and in the serum of 94%), with a mean particle size of 71 nm, and a $T_g$ of +28° C., and b) a weight ratio of the high $T_g$ polymer to the low $T_g$ polymer of 40:60, or the amount of the high $T_g$ polymer is 40 wt. %, based upon the total weight of the high $T_g$ polymer and the low $T_g$ polymer.

Comparative Example B

A redispersible polymer powder was produced as in Example 1 except that in Comparative Example B the redispersible polymer powder may be produced using a weight ratio of the high $T_g$ polymer to the low $T_g$ polymer of 40:60, or the amount of the high $T_g$ polymer is 40 wt. %, based upon the total weight of the high $T_g$ polymer and the low $T_g$ polymer.

Comparative Example C

A redispersible polymer powder was produced as in Example 1 except that in Comparative Example C the redispersible polymer powder may be produced without the high $T_g$ polymer, or a weight ratio of the high $T_g$ polymer to the low $T_g$ polymer of 0:100.

Comparative Example D

A redispersible polymer powder was produced as in Example 1 except that in Comparative Example D the redispersible polymer powder may be produced using a high $T_g$ water insoluble film forming carboxylated styrene butadiene (SB) latex which has a comonomer content of 69.4 parts styrene, 27.6 parts butadiene, and 3.0 parts itaconic acid (a carboxylation of 3.0 wt. % of itaconic acid, based upon the total comonomer weight, and a percentage of total acid found on the surface and in the serum of 94%), with a mean particle size of 71 nm, and a $T_g$ of +28° C.

EXAMPLE 5

The components and their relative amounts (wt. % or parts by weight, pbw) which may be used to prepare cement-based mortar compositions using the redispersible powder compositions of Examples 1, 2, 3, and 4, and Comparative Examples A, B, C, and D are shown in Table 1, below. The different cement-based mortar compositions may be prepared by dry blending the solid components indicated in Table 1, and then adding water.

TABLE 1

Cement-based Mortar Formulations

| RAW INGREDIENT | FORMULA, WT % |
|---|---|
| Portland Cement Type 1 42.5 | 28.00 |
| Quartz Sand 0.1 to 0.3 mm | 61.88 |
| Limestone Filler 200 mesh | 8.00 |
| Redispersible Polymer Powder (RDP) for each Example or comparative Example | 2.00 |
| METHOCEL 254 cellulose ether rheology modifier (Dow Chemical Co.) Typical Viscosity (Brookfield RVT, 20 rpm, 20° C., 2% in water) [0056] of 32000 | 0.12 |
| Total Dry Mix, wt. % | 100.00 |
| Water | 19.00 |

Various properties of the cement-based mortar compositions and their performance in two series of ETICS testing, as a function of the high $T_g$ polymer and low $T_g$ polymer blends employed in the redispersible polymer powders are shown in Tables 2 and 3.

Test Methods

Dry Mix Preparation: The cement, sand, polymer, and thickener are weighed and placed into a plastic bag which is then hand mixed for 2 minutes and conditioned for 24 hrs.

Adhesion: Adhesion to polystyrene was measured similar to ONORM 6121 after aging 14 days at room temperature. The test samples are prepared by applying the cementicious mortar at a thickness of 5 mm on an extruded polystyrene board (thickness 5 cm) in squares of the size of 50 mm×50 mm. Application works best when using an appropriate plastic template. The mortar is allowed to cure for 14 days at normal climate (rel. humidity 50±5% and a temperature of 23±2° C.). After curing of the mortar, metal anchors (50 mm×50 mm×10 mm) are glued onto the mortar patches with the help of an epoxy adhesive. Adhesive strength is determined by a tensile strength tester. The testing machine shall be capable of applying the load to the metal anchor at the rate of 250±50 N/s through a suitable fitting that does not exert any bending force.

Impact Resistance: The impact resistance rating was determined according to ETAG 004 on the polystyrene board coated with a glass mat reinforced ETICS mortar. The observed cracks in the panels were visually rated after testing with 3 Joules. No cracks received were given a "++" rating while much damaged panels were rated "--". Hard body impact (3 J) can either be done with a steel ball (500 g) falling from a height of 61 cm or a swinging pendulum where the polystyrene/mortar composite is fixed vertically in a rig.

Various properties of the cement-based mortar compositions using the RDPs of Example 1 and Comparative Examples A, B, C, and D and their performance in a first series of ETICS testing, as a function of the high $T_g$ polymer and low $T_g$ polymer blends employed in the redispersible polymer powders is shown in Table 2:

TABLE 2

Mortar Performance in ETICS For Redispersible Polymer Powders With Mixtures Of Styrene-Butadiene Latexes

| Styrene Butadiene Latex Properties and Performance in ETICS | REDISPERSIBLE POLYMER POWDER | | | | |
|---|---|---|---|---|---|
| | Example 1 | Comparative Example A | Comparative Example B | Comparative Example C | Comparative Example D |
| $T_g$ of High $T_g$ Latex, ° C. | +32 | +28 | +32 | NONE | +28 |
| $T_g$ of Low $T_g$ Latex, ° C. | −12 | −12 | −12 | −12 | −12 |
| Mean Particle Size, High $T_g$ Latex, nm | 168 | 71 | 168 | NONE | 71 |
| Mean Particle Size, Low $T_g$ Latex, nm | 168 | 168 | 168 | 168 | 168 |
| Mean Particle Size Ratio (High $T_g$ Latex:Low $T_g$ Latex) | 1.00 | 0.423 | 1.00 | Not Applicable | 0.423 |
| Weight Ratio High $T_g$ Latex:Low $T_g$ Latex | 30:70 | 40:60 | 40:60 | 0:100 | 30:70 |
| Adhesion to Polystyrene, N/mm² | 0.18 | 0.17 | 0.17 | 0.16 | 0.16 |
| Impact Resistance | ++ | -- | - | -- | + |

Table 2 compares performance in ETICS formulations of redispersible powders of a soft latex (Comparative Example C), the same soft latex blended with 30% & 40% low particle size high $T_g$ latex (Comparative Examples D and A, respectively), and the same soft latex blended with 30% & 40% of a high particle size high $T_g$ latex (Example 1, and Comparative Example B, respectively). All three of the latexes employed were polymerized with 3 parts itaconic acid and their percentage of total acid found on the surface and in the serum was 94% or more. Surprisingly it was found that the powder of Example 1 prepared from the blend based on 70% of the soft latex (168 nm $T_g$ −12° C.) and 30% of the high particle size high $T_g$ latex (168 nm $T_g$ +32° C.) with the higher particle size ratio of high $T_g$ to low $T_g$ of 1:1 provided the highest adhesion strength (0.18 N/mm²) to polystyrene combined with the best impact resistance. As shown in Table 2, the same low $T_g$ latex is employed in Example 1 and each of Comparative Examples A, B, C, and D, but the properties obtained with the RDP of Example 1 were unexpectedly better than those achieved with: 1) the single soft latex RDP of Comparative Example C, 2) the RDP of Comparative Example B which contains a blend of the same soft latex with a higher fraction of the high $T_g$ latex, 3) the RDP of Comparative Example D with a high $T_g$, low particle size latex, and 4) the RDP of Comparative Example A with a higher fraction of the high $T_g$, low particle size latex. As shown in Table 2, best performance was achieved with RDPs containing blends with 30% high $T_g$ latex, and increasing the blend ratio of the high $T_g$ latex reduced the impact resistance as shown for Example 1 vs. Comparative Example B, and also for Comparative Example D vs. Comparative Example A.

Various properties of the cement-based mortar compositions using the RDPs of Examples 1, 2, 3, and 4 and their performance in a second series of ETICS testing as a function of the high $T_g$ polymer and low $T_g$ polymer blends employed in the redispersible polymer powders is shown in Table 3:

TABLE 3

Mortar Performance in ETICS For Redispersible Polymer Powders With Mixtures Of Styrene-Butadiene Latexes

| Styrene Butadiene Latex Properties and Performance in ETICS | REDISPERSIBLE POLYMER POWDER | | | |
|---|---|---|---|---|
| | Example 1 | Example 2 | Example 3 | Example 4 |
| $T_g$ of High $T_g$ Latex, ° C. | +32 | +34 | +34 | +34 |
| $T_g$ of Low $T_g$ Latex, ° C. | −12 | −12 | −12 | −12 |
| Mean Particle Size, | 168 | 243 | 243 | 243 |

TABLE 3-continued

Mortar Performance in ETICS For Redispersible Polymer Powders With Mixtures Of Styrene-Butadiene Latexes

| Styrene Butadiene Latex Properties and Performance in ETICS | REDISPERSIBLE POLYMER POWDER | | | |
|---|---|---|---|---|
| | Example 1 | Example 2 | Example 3 | Example 4 |
| High $T_g$ Latex, nm Mean Particle Size, Low $T_g$ Latex, nm | 168 | 178 | 178 | 178 |
| Mean Particle Size Ratio (High $T_g$ Latex:Low $T_g$ Latex) | 1.00 | 1.37 | 1.37 | 1.37 |
| Weight Ratio High $T_g$ Latex:Low $T_g$ Latex | 30:70 | 25:75 | 30:70 | 35:65 |
| Adhesion to Polystyrene, N/mm² | 0.11 | 0.10 | 0.11 | 0.09 |
| Impact Resistance | + | ++ | + | + |

Table 4 compares performance of redispersible polymer powders of the present invention based on blends where the high $T_g$ latex employed ($T_g$ 34/243 nm) has even a higher particle size than the low $T_g$ latex ($T_g$ −12° C./178 nm) where the particle size ratio is 1.37 in Examples 2, 3, and 4, to a redispersible polymer powder of Example 1 based on the latex blend with a particle size ratio of 1.00. The good adhesion and impact resistance achieved with the redispersible polymer powder of Example 1 was confirmed in this series of ETICS testing. By further increasing the particle size of the high $T_g$ latex as in Examples 2 through 4, the good adhesion was maintained while further improvement for impact resistance was observed for a hard:soft blend ratio (high $T_g$ latex to low $T_g$ latex ratio) of 25:75. Increasing the hard component or high $T_g$ latex above 30% led to a decrease of adhesive strength and/or impact resistance compared to results obtained with a ratio of 25:75, however the results were still excellent. The bond strength data in Table 3 are significantly lower compared to those of Table 2. This is caused by a difference in the quality of polystyrene boards used for the two test series. The type of board was not changed within one test series. However, in Table 3 the polystyrene board (PS) had a lower quality resulting in lower adhesion values. In all cases the ETICS mortar/PS interface withstood the tensile test. Cohesive failure was observed only within the PS (polystyrene) board.

What is claimed is:

1. A water redispersible polymer powder (RDP) comprising a co-dried admixture of:
  A) a water insoluble film-forming high $T_g$ polymer, said film forming polymer comprising a styrene-butadiene copolymer or the copolymerization product of styrene, butadiene and one or more other monomer and having a glass transition temperature ($T_g$) of greater than 15° C., an average particle size of from 50 nm to 500 nm, and an amount of carboxylation of from 0.1 wt. % to 10 wt. % of at least one ethylenically unsaturated mono- and/or di-carboxylic acid, salts thereof, or mixtures thereof, based upon the weight of the water insoluble film forming high $T_g$ polymer, and
  B) a water insoluble film-forming low $T_g$ polymer, said film forming polymer comprising a styrene-butadiene copolymer or the copolymerization product of styrene, butadiene and one or more other monomer and having a glass transition temperature ($T_g$) of from −30° C. to 10° C., an average particle size of from 20 nm to 400 nm, and an amount of carboxylation of from 0.1 wt. % to 10 wt. % of at least one ethylenically unsaturated mono- and/or di-carboxylic acid, salts thereof, or mixtures thereof, based upon the weight of the water insoluble film forming low $T_g$ polymer, wherein the ratio of the average particle size of the high $T_g$ polymer to the low $T_g$ polymer is from 1:1 to 5:1, and the amount of the high $T_g$ polymer is from 20 wt. % to 35 wt. %, based upon the total weight of the high $T_g$ polymer and the low $T_g$ polymer.

2. A water redispersible polymer powder as claimed in claim 1 wherein the high $T_g$ polymer has an average particle size of from 100 nm to 400 nm, an amount of carboxylation of from 0.5 wt. % to 7 wt. %, and a glass transition temperature ($T_g$) of at least 20° C., and the low $T_g$ polymer has an average particle size of from 50 nm to 300 nm, an amount of carboxylation of from 0.5 wt. % to 7 wt. %, and a glass transition temperature ($T_g$) of from −20° C. to 0° C., wherein the ratio of the average particle size of the high $T_g$ polymer to the low $T_g$ polymer is from 1:1 to 3:1.

3. A water redispersible polymer powder as claimed in claim 1 wherein the high $T_g$ polymer has an average particle size of from 150 nm to 300 nm, an amount of carboxylation of from 1 wt. % to 5 wt. %, and a glass transition temperature ($T_g$) of from 25° C. to 50° C., and the low $T_g$ polymer has an average particle size of from 100 nm to 200 nm, an amount of carboxylation of from 1 wt. % to 5 wt. %, and a glass transition temperature ($T_g$) of from −20° C. to 0° C., wherein the ratio of the average particle size of the high $T_g$ polymer to the low $T_g$ polymer is from 1:1 to 3:1, the amount of the high $T_g$ polymer is from 25 wt. % to 30 wt. %, based upon the total weight of the high $T_g$ polymer and the low $T_g$ polymer, and each of the high $T_g$ polymer and the low $T_g$ polymer is a copolymer comprising the monomers styrene, butadiene, and itaconic acid.

4. A water redispersible polymer powder as claimed in claim 1 further comprising a colloidal stabilizer in an amount of at least 1 wt. % and up to 30 wt. % based upon the weight of the water insoluble film-forming polymers, and a fatty acid salt in an amount of least 1 wt. %, based upon the weight of the water insoluble film forming polymers.

5. A water redispersible polymer powder as claimed in claim 4 wherein the colloidal stabilizer comprises a polyvinyl alcohol in an amount of from 5 wt. % to 20 wt. %, based upon the weight of the water insoluble film forming polymers, the fatty acid salt comprises sodium oleate in an amount of from 5 wt. % to 15 wt. %, based upon the weight of the water insoluble film forming polymers, at least 75% of the total number of carboxylic groups present in each of the polymers are located at the surface of the copolymer powder particles, and at least 75% of the carboxylic groups located at the surface of the copolymer powder particles are present in their salt form.

6. A method for producing a water redispersible polymer powder comprising drying an aqueous mixture of:
  A) a water insoluble film-forming high $T_g$ polymer, said film forming polymer comprising a styrene-butadiene copolymer or the copolymerization product of styrene, butadiene and one or more other monomer and having a glass transition temperature ($T_g$) of greater than 15° C., an average particle size of from 50 nm to 500 nm, and an amount of carboxylation of from 0.1 wt. % to 10 wt. % of at least one ethylenically unsaturated mono- and/or di-carboxylic acid, salts thereof, or mixtures thereof, based upon the weight of the water insoluble film forming high $T_g$ polymer,
  B) a water insoluble film-forming low $T_g$ polymer, said film forming polymer comprising a styrene-butadiene copolymer or the copolymerization product of styrene, butadiene and one or more other monomer and having a glass transition temperature ($T_g$) of from −30° C. to 10° C., an average particle size of from 20 nm to 400 nm, and an amount of carboxylation of from 0.1 wt. % to 10 wt. % of at least one ethylenically unsaturated mono- and/or di-carboxylic acid, salts thereof, or mixtures thereof, based upon the weight of the water insoluble film forming low $T_g$ polymer, and
  C) a colloidal stabilizer,
  wherein the ratio of the average particle size of the high $T_g$ polymer to the low $T_g$ polymer is from 1:1 to 5:1, and the amount of the high $T_g$ polymer is from 20 wt. % to 35 wt. %, based upon the total weight of the high $T_g$ polymer and the low $T_g$ polymer.

7. A method for producing a water redispersible polymer powder as claimed in claim 6 wherein the high $T_g$ polymer has an average particle size of from 100 nm to 400 nm, an amount of carboxylation of from 0.5 wt. % to 7 wt. %, and a glass transition temperature ($T_g$) of at least 20° C., and the low $T_g$ polymer has an average particle size of from 50 nm to 300 nm, an amount of carboxylation of from 0.5 wt. % to 7 wt. %, and a glass transition temperature ($T_g$) of from −20° C. to 0° C., wherein the ratio of the average particle size of the high $T_g$ polymer to the low $T_g$ polymer is from 1:1 to 3:1.

8. A method for producing a water redispersible polymer powder as claimed in claim 6 wherein the high $T_g$ polymer has an average particle size of from 150 nm to 300 nm, an amount of carboxylation of from 1 wt. % to 5 wt. %, and a glass transition temperature ($T_g$) of from 25° C. to 50° C., and the low $T_g$ polymer has an average particle size of from 100 nm to 200 nm, an amount of carboxylation of from 1 wt. % to 5 wt. %, and a glass transition temperature ($T_g$) of from −20° C. to 0° C., wherein the ratio of the average particle size of the high $T_g$ polymer to the low $T_g$ polymer is from 1:1 to 3:1, the amount of the high $T_g$ polymer is from 25 wt. % to 30 wt. %, based upon the total weight of the high $T_g$ polymer and the low $T_g$ polymer, each of the high $T_g$ polymer and the low $T_g$ polymer is a copolymer comprising the monomers styrene, butadiene, and itaconic acid, the colloidal stabilizer comprises polyvinyl alcohol, and the aqueous mixture further includes a fatty acid salt comprising sodium oleate.

9. A method for making a cement composition comprising admixing cement ingredients with a water redispersible polymer powder as claimed in which is a co-dried admixture of:
  A) a water insoluble film-forming high $T_g$ polymer, said film forming polymer comprising a styrene-butadiene copolymer or the copolymerization product of styrene, butadiene and one or more other monomer and having a glass transition temperature ($T_g$) of greater than 15° C., an average particle size of from 50 nm to 500 nm, and an amount of carboxylation of from 0.1 wt. % to 10 wt. % of at least one ethylenically unsaturated mono- and/or di-carboxylic acid, salts thereof, or mixtures thereof, based upon the weight of the water insoluble film forming
  B) a water insoluble film-forming low $T_g$ polymer, said film forming polymer comprising a styrene-butadiene copolymer or the copolymerization product of styrene, butadiene and one or more other monomer and having a glass transition temperature ($T_g$) of from −30° C. to 10° C. an average particle size of from 20 nm to 400 nm and an amount of carboxylation of from 0.1 wt. % to 10 wt. % of at least one ethylenically unsaturated mono- and/or di-carboxylic acid, salts thereof, or mixtures thereof, based upon the weight of the water insoluble film forming low $T_g$ polymer, wherein the ratio of the average particle size of the high $T_g$ polymer to the low $T_g$ polymer is from 1:1 to 5:1, and the amount of the high $T_g$ polymer is from 20 wt. % to 35 wt. %, based upon the total weight of the high $T_g$ polymer and the low $T_g$ polymer.

10. A dry mix formulation comprising cement ingredients and a water redispersible polymer powder which is a co-dried admixture of:
  A) a water insoluble film-forming high $T_g$ polymer, said film forming polymer comprising a styrene-butadiene copolymer or the copolymerization product of styrene, butadiene and one or more other monomer and having a glass transition temperature ($T_g$) of greater than 15° C. an average particle size of from 50 nm to 500 nm and an amount of carboxylation of from 0.1 wt. % to 10 wt. % of at least one ethylenically unsaturated mono- and/or di-carboxylic acid, salts thereof, or mixtures thereof, based upon the weight of the water insoluble film forming high $T_g$ polymer, and
  B) a water insoluble film-forming low $T_g$ polymer, said film forming polymer comprising a styrene-butadiene copolymer or the copolymerization product of styrene, butadiene and one or more other monomer and having a glass transition temperature ($T_g$) of from −30° C. to 10° C., an average particle size of from 20 nm to 400 nm, and an amount of carboxylation of from 0.1 wt. % to 10 wt. % of at least one ethylenically unsaturated mono- and/or di-carboxylic acid, salts thereof, or mixtures thereof, based upon the weight of the water insoluble film forming $T_g$ polymer,
wherein the ratio of the average particle size of the high $T_g$ polymer to the low $T_g$ polymer is from 1:1 to 5:1 and the amount of the high $T_g$ polymer is from 20 wt. % to 35 wt. %, based upon the total weight of the high $T_g$ polymer and the low $T_g$ polymer in an amount of at least 0.1 wt. %, based upon the weight of the dry mix formulation.

* * * * *